United States Patent [19]
Takei

[11] Patent Number: 5,387,093
[45] Date of Patent: Feb. 7, 1995

[54] APPARATUS FOR MANUFACTURING SEAMLESS CAPSULES

[75] Inventor: Narimichi Takei, Sugito, Japan

[73] Assignee: Freund Inphachem Inc., Los Angeles, Calif.

[21] Appl. No.: 168,911

[22] Filed: Dec. 16, 1993

Related U.S. Application Data

[60] Continuation of Ser. No. 950,015, Sep. 24, 1992, abandoned, which is a division of Ser. No. 706,230, May 28, 1991, Pat. No. 5,186,948.

[51] Int. Cl.⁶ .............................................. B29B 9/00
[52] U.S. Cl. ........................................ 425/5; 264/4; 264/4.3; 425/10; 425/70; 425/133.1
[58] Field of Search ................ 264/4, 4.3, 14; 425/5, 425/6, 10, 67, 69, 70, 130, 133.1

[56] References Cited

U.S. PATENT DOCUMENTS

| | | |
|---|---|---|
| 2,436,439 | 2/1948 | Lincoln et al. .......................... 425/5 |
| 3,330,774 | 7/1967 | Kuwata et al. .......................... 425/6 |
| 3,464,926 | 9/1969 | Vandegaer et al. .................... 425/5 |
| 4,271,037 | 6/1981 | Hausmann .............................. 425/10 |
| 4,384,835 | 5/1983 | Bland ..................................... 425/10 |
| 4,422,985 | 12/1983 | Morishita et al. ..................... 425/6 |

FOREIGN PATENT DOCUMENTS

1007471 5/1957 Germany ................. 425/6

Primary Examiner—Charles S. Bushey
Attorney, Agent, or Firm—Kane, Dalsimer, Sullivan, Kurucz, Levy and Richard

[57] ABSTRACT

An apparatus for manufacturing seamless capsules is provided with a multiple nozzle which blows multilayer liquid drops into a hardening liquid. The hardening liquid flows through a main flow path and an auxiliary flow path. The flow of hardening liquid through the main flow path is biased in a direction intersecting the main flow path by a flow of hardening liquid into the main flow path from the auxiliary flow path or a discharge of the hardening liquid from the main flow path into the auxiliary flow path.

4 Claims, 11 Drawing Sheets

APPARATUS FOR MANUFACTURING SEAMLESS CAPSULES

This application is a continuation of application Ser. No. 07/950,015, filed Sep. 24, 1992, now abandoned, which is a division of Ser. No. 07/706,230 filed May 28, 1991, and now U.S. Pat. No. 5,186,948.

BACKGROUND OF THE INVENTION

1. Field of the Invention

This invention relates to techniques of manufacturing seamless capsules, and more particularly to an apparatus for manufacturing seamless capsules by use of a multiple nozzle.

2. Description of the Prior Art

Among the techniques of manufacturing a capsule having no seam in a shell, i.e. a seamless capsule, there has been known methods wherein a multilayer liquid flow is blown out of a multiple nozzle such as a double nozzle or a triple nozzle to form multilayer liquid drops, and the outermost layer liquid of the multilayer liquid drop is contacted with a hardening liquid to be hardened and thereby sealedly enclose the liquid in the inner layer, this technique being particularly suitable for manufacturing a seamless capsule smaller than a conventional soft capsule although larger than a microcapsule.

In one of these techniques, i.e. in-the-air nozzle method wherein a nozzle disposed in the air is vibrated to produce liquid drops in the air and to drop them into hardening liquid, when the liquid drop impinge on the liquid surface of the hardening liquid, due to the impact of the impingement, the liquid drop is deformed to be flat and may be destroyed in the extreme case. In order to prevent this, the present inventor has previously proposed a method wherein multilayer liquid drops are dropped into the flow of the hardening liquid in the forward direction of the flow (Japanese Patent Laid-Open No. 62-176536).

However, various conditions of manufacturing the capsules are not always constant. For example, in order to manufacture capsules having compositions different from each other, it should be natural that the liquid compositions of the inner and outer layers and the like, and the compositions of the hardening liquids are varied, so that the degrees of deformation are different. Further, even with capsules having the same material compositions, if the particle diameters are different from each other, then the degrees of deformation are different. Furthermore, even if capsules are of the completely identical type, the states of the liquid drops are delicately varied due to the variations in composition among the lots, environmental air temperature, liquid temperature and the like.

As the result, there arise such disadvantages that the seamless capsules having odd-shapes as shown in FIGS. 13(A) through 13(E) are manufactured.

Figure 13A:
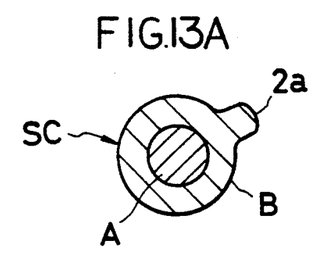
FIGS. 13(A) through 13(E) are enlarged sectional views showing examples of nonpreferable seamless capsules and FIG. 13(F) is an enlarged sectional view showing a preferred seamless capsule manufactured according to the present invention.
Figure 13B:
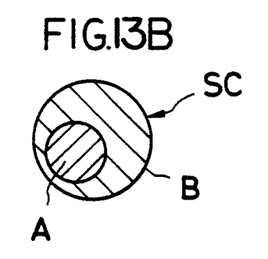
Figure 13C:
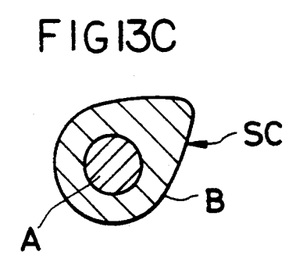
Figure 13D:
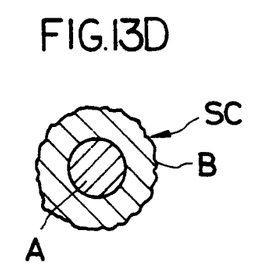
Figure 13E:
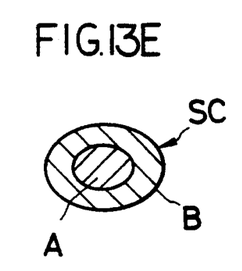

Namely, FIG. 13(A) shows an example wherein a projection 2a is formed on the outer layer B enclosing the inner layer A of a seamless capsule SC. FIG. 13(B) an example wherein the inner layer A and the outer layer B are eccentric from each other. FIG. 13(C) an example where the outer layer B is of an oval shape. FIG. 13(D) an example where wrinkles are made on the outer surface of the outer layer B. and FIG. 13(E) an example where both the inner layer A and the outer layer B are of ellipsoidal shapes, respectively.

In order to always maintain the best conditions according to the changes in the above-described manufacturing conditions, it is conceived to adjust the inclination angle of a U-shaped groove for the flow of hardening liquid in the apparatus disclosed in Japanese Patent Laid-Open No. 62-176586 referred above so that the relative speed between the liquid drops and the flow of the hardening liquid is maintained at optimal.

However, the study of the inventor of the present invention has proved that the above-described method presents the following disadvantages. Namely, (1) it is necessary to change the inclination angle of the nozzle according to the change of the inclination angle of the U-shaped groove while keeping the interval between the nozzle and the U-shaped groove constant, and (2) if the Inclination angle of the U-shaped groove is changed, then the vertical distance and the horizontal distance between the top end and the bottom end of the U-shaped groove are varied, in accordance with which the positions of a hardening liquid tank and a separator should be adjusted, so that adjusting devices become large-sized and complicated, and furthermore, (3) it is difficult to finely adjust the inclination angle of the U-shaped groove, the positions of the hardening liquid tank and separator, and so forth.

Further, the study of the inventor of the present Invention has made it clear that, even with a method wherein a multiple nozzle is provided within the hardening liquid i.e. in-the-liquid nozzle method, the shapes of the liquid drops are delicately changed by the relative speed between the liquid drops and the hardening liquid at a stage where the multilayer liquid drops blown out of the nozzle are hardened. In this "in-the-liquid" case, essentially the measures for adjusting the inclination angle of the U-shaped groove cannot be utilized for a conventional apparatus such as disclosed in Japanese Patent Publication No. 53-1067 because of its structure.

SUMMARY OF THE INVENTION

An object of the present invention is to provide techniques capable of manufacturing satisfactory seamless capsules without deformation.

Another object of the present invention is to provide techniques capable of easily adjusting the relative speed between multilayer liquid drops and a flow of the hardening liquid in manufacturing seamless capsules.

The following is a brief description of the outlines of the typical invention disclosed here.

Namely, as one aspect of the present invention, there is provided an apparatus for manufacturing seamless capsules, wherein a multilayer liquid flow is blown out of a multiple nozzle to form multilayer liquid drops, the multilayer liquid drops are brought into contact with a hardening liquid to obtain seamless capsules, and the position of the multiple nozzle is movably adjustable in a direction intersecting the flow of the hardening liquid.

Furthermore, as another aspect of the invention, there is provided an apparatus for manufacturing the seamless capsules, wherein the multilayer liquid flow is blown out of the multiple nozzle to form multilayer liquid drops, the liquid drops are brought into contact with a hardening liquid to obtain the seamless capsules and an auxiliary flow path for the hardening liquid is provided in addition to the above-described flow path of the hardening liquid in the manner that the flow rate of the auxiliary flow path can be adjusted.

According to the former apparatus for manufacturing the seamless capsules, the position of the multiple nozzle is movably adjustable in a direction intersecting the flow of the hardening liquid or preferably perpendicular thereto. By this, the multilayer liquid drops blown out of the multiple nozzle can be brought into the hardening liquid at different positions, and thereby the relative speed between the multilayer liquid drops and the hardening liquid can be optionally adjusted, so that the shapes of the multilayer liquid drops can be always controlled to the optimal shapes, thus obtaining the seamless capsules having the satisfactory shapes without deformation.

Furthermore, according to the later apparatus, an auxiliary flow path of the hardening liquid connected to the flow path of the hardening liquid is provided, whereby the flow rate of the auxiliary flow path is made adjustable, and the relative speed between the multilayer liquid drops and the hardening liquid can be adjusted by the flow rate of the auxiliary flow path to the optimal value, so that the shapes of the multilayer liquid drops can be always controlled to the optimal shapes and the seamless capsules having the satisfactory shapes without deformation can be obtained.

BRIEF DESCRIPTION OF THE DRAWINGS

The above-described and other objects and novel features of the present invention will become more apparent from the following description given in conjunction with the accompanying drawings, wherein.

DETAILED DESCRIPTION OF THE PREFERRED EMBODIMENTS

Embodiment 1

Figure 1:
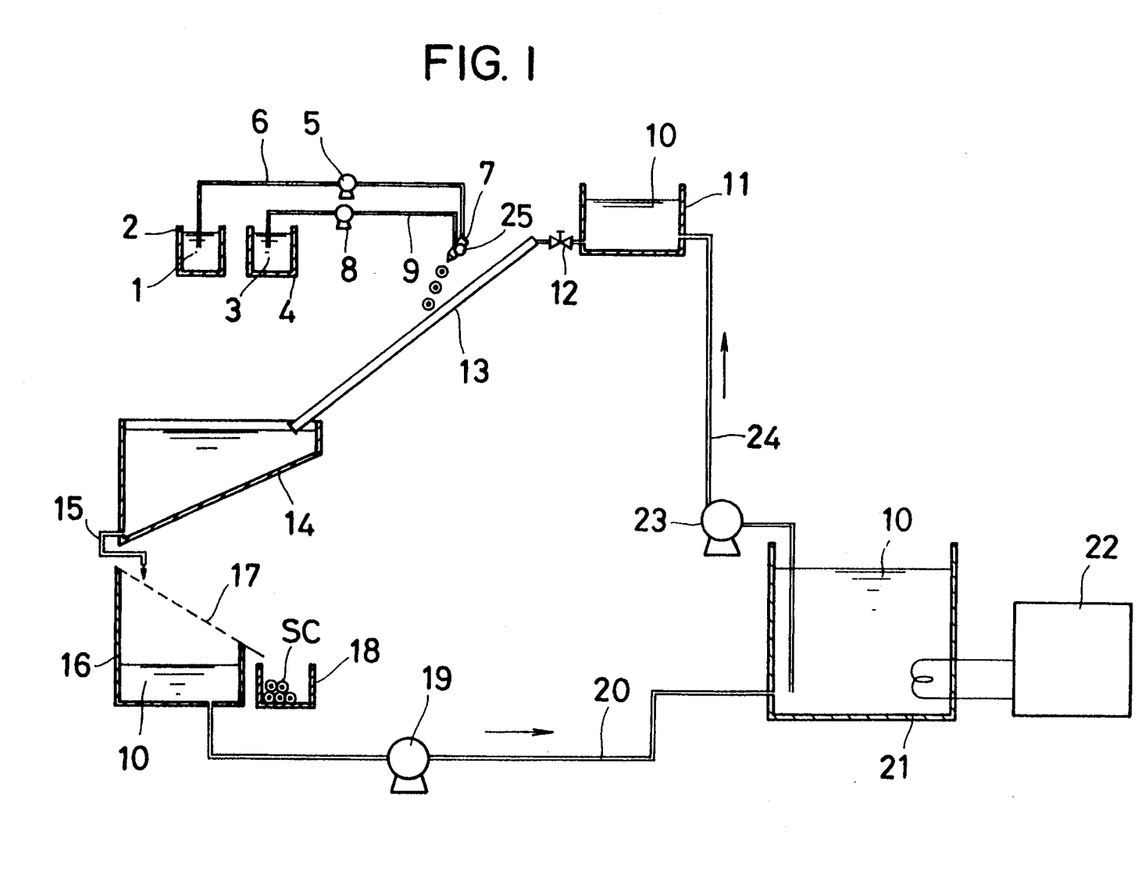
FIG. 1 is a schematic explanatory view showing an embodiment in which the present invention is applied to the in-the-air nozzle type apparatus for manufacturing the seamless capsules.
Figure 2A:
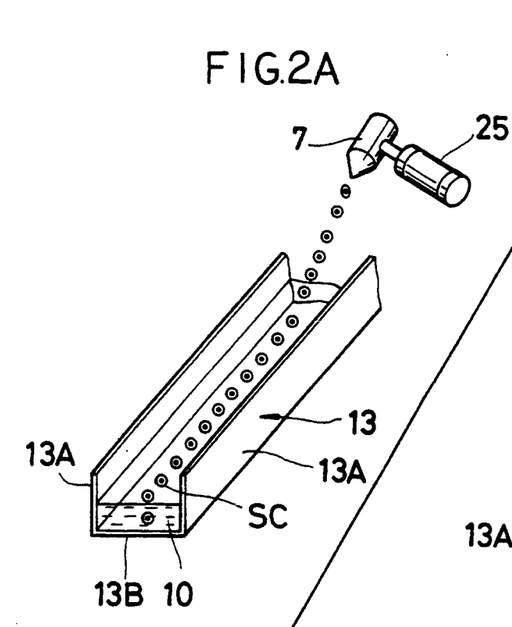
FIGS. 2(A) and 2(B) are an enlarged perspective view and an enlarged sectional view of the essential portion of FIG. 1.
Figure 2B:
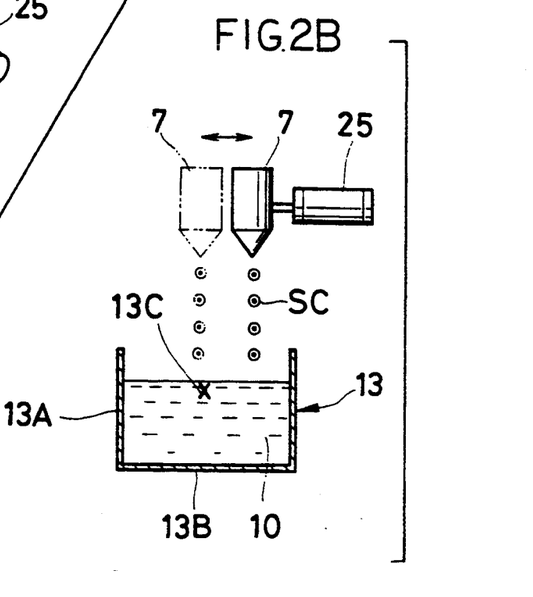

FIG. 1 is the schematic explanatory view showing one embodiment in which the present invention is applied to the in-the-air nozzle type apparatus for manufacturing the seamless capsules, and FIGS. 2(A) and 2(B) are the enlarged perspective view and the enlarged sectional view of the essential portion of FIG. 1.

In the in-the-air nozzle type apparatus for manufacturing the seamless capsules as shown in FIG. 1, core liquid (inner layer liquid) 1 for forming the seamless capsules is stored in a core liquid tank 2, and film liquid (outer layer liquid) 3 for encapsulating the core liquid 1 is stored in a outer layer liquid tank 4.

The core liquid 1 is delivered under pressure by a pump 5 from the core liquid tank 2 to the multiple nozzle 7 through a conduit 6, while, the film liquid 3 is delivered under pressure by a pump 8 from the outer layer liquid tank 4 to the multiple nozzle 7 through a conduit 9.

The core liquid 1 and the film liquid 3 are blown out of the multiple nozzle 7 in the air, drop into hardening liquid to be described hereunder, and form a multilayer liquid drop type seamless capsule SC.

Furthermore, the hardening liquid 10 for hardening multilayer liquid drops blown out of the multiple nozzle 7 in a process of manufacturing the seamless capsules SC is stored in a hardening liquid tank 11, caused to flow out at a predetermined flow rate into an inclined U-shaped groove 13 (hardening liquid flow path) through a valve 12, and flows down into a recovery tank 14.

A pipe 15 is connected to the bottom portion of the recovery tank 14, the seamless capsules SC recovered in the recovery tank 14 are caused to flow together with the hardening liquid 10 out from the bottom portion of the recovery tank 14 into a separating tank 16 through the pipe 15.

Provided on the top portion of the separating tank 16 is an inclined porous body 17, which has Such a porous construction that the pores do not allow the seamless capsules SC which have flowed out from the pipe 15 to pass therethrough, whereby the seamless capsules SC move forward while turning round along the inclined surface of the inclined porous body 17 and are recovered in a product recovery container 18.

On the other hand, the hardening liquid 10 flowing down from the pipe 15 onto the inclined porous body 17 passes through the pores of the inclined porous body 17 and flows down into the separating tank 16.

The hardening liquid 10 in the separating tank 16 is delivered under pressure by a pump 19 into the cooling tank 21 through a conduit 20. The hardening liquid 10 in the cooling tank 21 is cooled to a predetermined temperature by a cooler 22, and thereafter, returned by a pump 23 into the hardening liquid tank 11 through a conduit 24.

As described above, the hardening liquid 10 is circulated through a circuit constituted by the hardening liquid tank 11, the valve 12, the U-shaped groove 13, the recovery tank 14, the pipe 15, the separating tank 16, the conduit 20, the cooling tank 21 and the conduit 24, and used for hardening the seamless capsules SC.

The study by the present inventor has proved that, as described above, in the in-the-air nozzle type apparatus for manufacturing the seamless capsules, the shapes of the multilayer liquid drops of the core liquid and the film liquid 3 which are caused to flow out of the multiple nozzle 7 into the U-shaped groove 13 are delicately varied by the relative speed between the multilayer liquid drops and the flow of the hardening liquid 10.

Now, the flow speed of the hardening liquid 10 flowing down in the U-shaped groove 13 is highest in a portion which is most distant from a side wall 13A and a bottom wall 13B (Refer to FIG. 2), i.e. a portion 13C in the center of a liquid surface portion in FIG. 2, and is lower in portions which are closer to the side wall 13A and the bottom wall 13B.

Now, in this embodiment, as shown in FIGS. 2(A) and 2(B), there is provided a nozzle moving device 25 for displacing the multiple nozzle 7 in a direction intersecting or preferably perpendicular to the flow of the hardening liquid 10 in the U-shaped groove 13, and the nozzle moving device 25 is directly or indirectly connected to the multiple nozzle 7. This nozzle moving device 25 may be formed of a motor, a fluid pressure cylinder device, a rotary actuator or the like. Consequently, according to this embodiment, the multiple nozzle may be optionally displaced by the nozzle moving device 25 in the direction intersecting or perpendicular to the flow of the hardening liquid 10 in the U-shaped groove 13.

Namely, when the multiple nozzle 7 is disposed at a position indicated by two-dot chain lines in FIG. 2(B) for example, the liquid drops of the seamless capsules SC blown out of the multiple nozzle 7 drop into the portion having the highest flow speed of the hardening liquid (the portion 13C at the center of the liquid surface portion), whereas, when the multiple nozzle 7 is moved by the nozzle moving device 25 to a position indicated by solid lines, the liquid drops drop into the position having the lower flowing speed of the hardening liquid 10 than the above.

With this arrangement, the relative speed between the liquid drops of the seamless capsules blown out of the multiple nozzle 7 and the flow of the hardening liquid 10 in the U-shaped groove 13 can be optionally adjusted.

Particularly, the position of the multiple nozzle 7 in the embodiment shown in FIG. 2 can be finely adjusted by the nozzle moving device 25, so that the relative speed between the liquid drops of the seamless capsules SC and the flow of the hardening liquid 10 can be easily and finely adjusted.

Figure 13F:
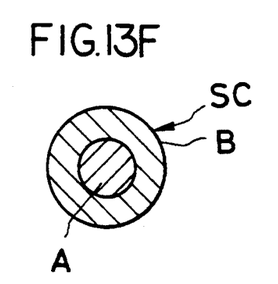

With this arrangement, the shapes of the seamless capsules SC can be controlled to the optimal shapes, so that, as shown in FIG. 13(F), the seamless capsule SC having true sphericity, in which the inner layer as being the core liquid is positioned in the center portion of the outer layer as being the film liquid and uniformly coated thereby, can be obtained.

Furthermore, in this embodiment, only the multiple nozzle 7 is a movable portion for adjusting the relative speed, so that the nozzle moving device 25 may remain small-sized and simplified.

Embodiment 2

Figure 3:
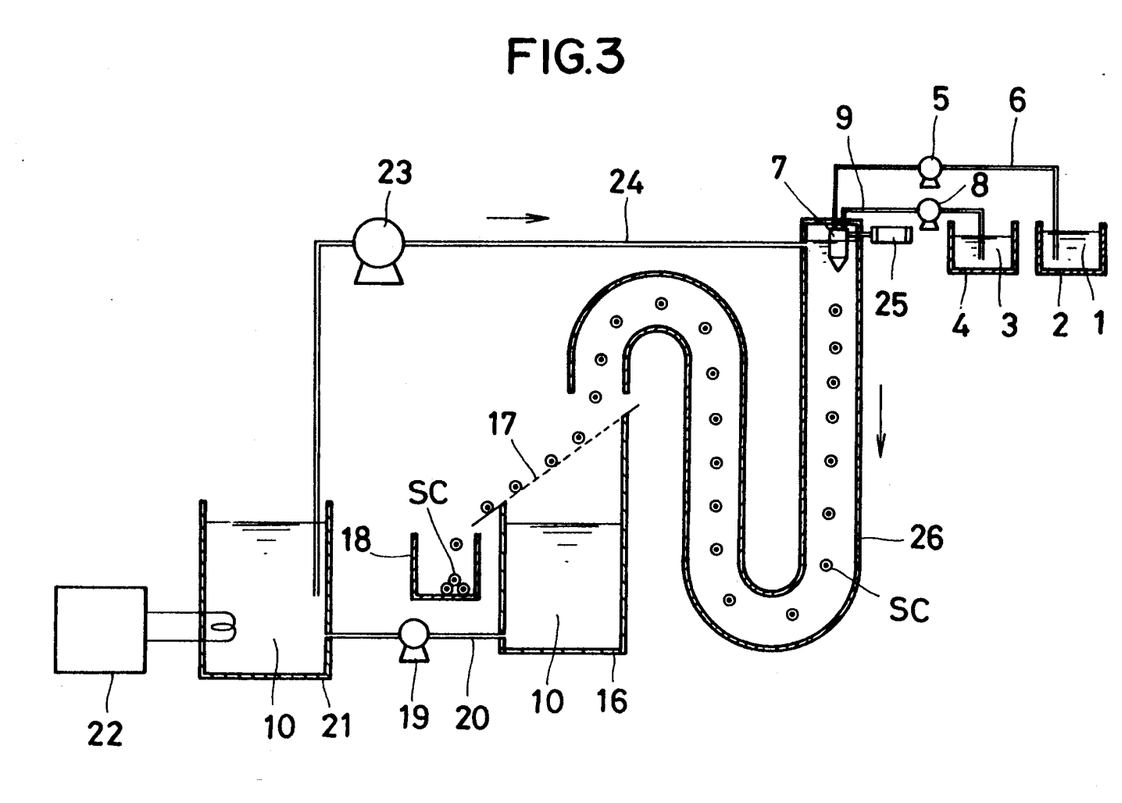
FIG. 3 is a schematic explanatory view showing an embodiment in which the present invention is applied to the in-the-liquid nozzle type apparatus for manufacturing the seamless capsules.
Figure 4:
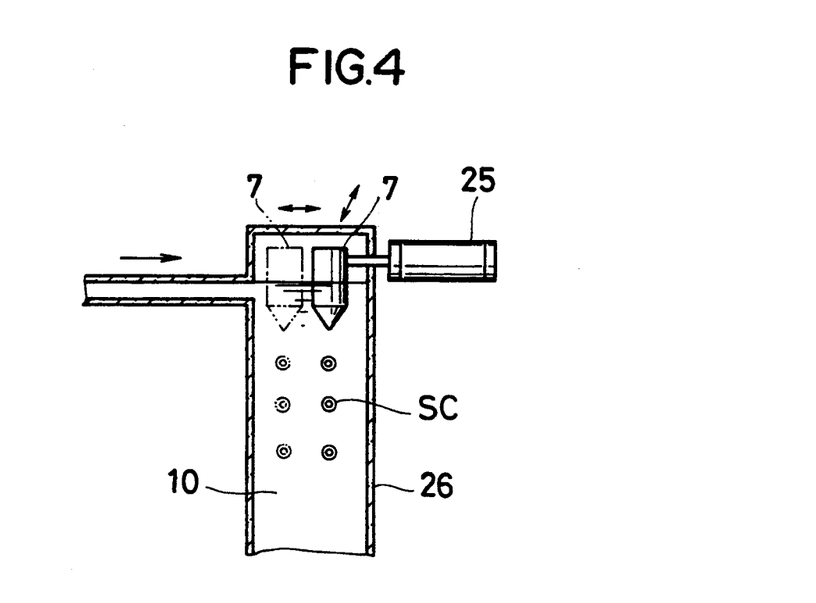
FIG. 4 is an enlarged sectional view of the essential portion thereof.

Next, FIG. 3 is the schematic explanatory view showing an embodiment in which the present invention is applied to the in-the-liquid nozzle type apparatus for manufacturing the seamless capsules, and FIG. 4 is the enlarged sectional view showing the essential portions thereof.

in the embodiments shown in FIGS. 8 and 4, the same reference numerals in FIGS. 1 and 2 are used to designate the same or similar parts corresponding to ones as shown in FIGS. 1 and 2, so that duplicate description will be avoided.

The apparatus for manufacturing the seamless capsules in the embodiments shown in FIGS. 3 and 4 has the in-the-liquid type construction, whereby the multiple nozzle 7 is inserted into an inlet portion of a main flow pipe 26 forming a main flow course for supplying the hardening liquid 10 (main flow path of the hardening liquid), so that the core liquid 1 and the film liquid 3 are blown out into the hardening liquid 10 in such a manner that the whole outer periphery of the former is encapsulated with the latter.

Accordingly, in this embodiment, the core liquid 1 and the film liquid 3 are blown out of the multiple nozzle 7 to form multilayer liquid drops within the hardening liquid 10 in the main flow path 26. And, as the multilayer liquid drops flow in the main flow path 26, the liquid drops are hardened through the action of the hardening liquid 10, so that the seamless capsules SC can be formed.

The seamless capsules SC thus formed flow down together with the hardening liquid 10 from an outlet end of the main flow pipe 26 onto the inclined porous body 17, where the seamless capsules SC are separated from the hardening liquid 10, turn round along the inclined surface of the inclined porous body 17 and are recovered in the product recovery container 18.

In the in-the-liquid type apparatus for manufacturing the seamless capsules as shown in FIGS. 3 and 4, the flowing speed of the hardening liquid 10 in the main flow path pipe 26 is highest in the central portion of the main flow pipe 26 having a circular sectional shape for example and lower in portions which are closer to the pipe wall.

Then, also in this embodiment, the multiple nozzle 7 can be movably adjusted by the nozzle moving device 28 in the direction intersecting or preferably perpendicular to the flow of the hardening liquid 10 in the main flow pipe 26 as indicated by an arrow in FIG. 4 for example, thus enabling to adjust the relative speed of the liquid drops with the flow of the seamless capsules.

The direction of movement of the multiple nozzle 7 at this time may be in any radial direction for example. Or the multiple nozzle 7 may be moved both in a radial direction and in a direction perpendicular thereto. In short, the direction of movement of the multiple nozzle 7 may be in the direction intersecting or, preferably, perpendicular to the flow of the hardening liquid 10.

Accordingly, in the embodiments shown in FIGS. 3 and 4 also, the multiple nozzle 7 may be moved by the nozzle moving device 25 to the direction intersecting the flow of the hardening liquid 10, so that the seamless capsules SC having the satisfactory shapes can be manufactured at all times.

Embodiment 8

Figure 5:
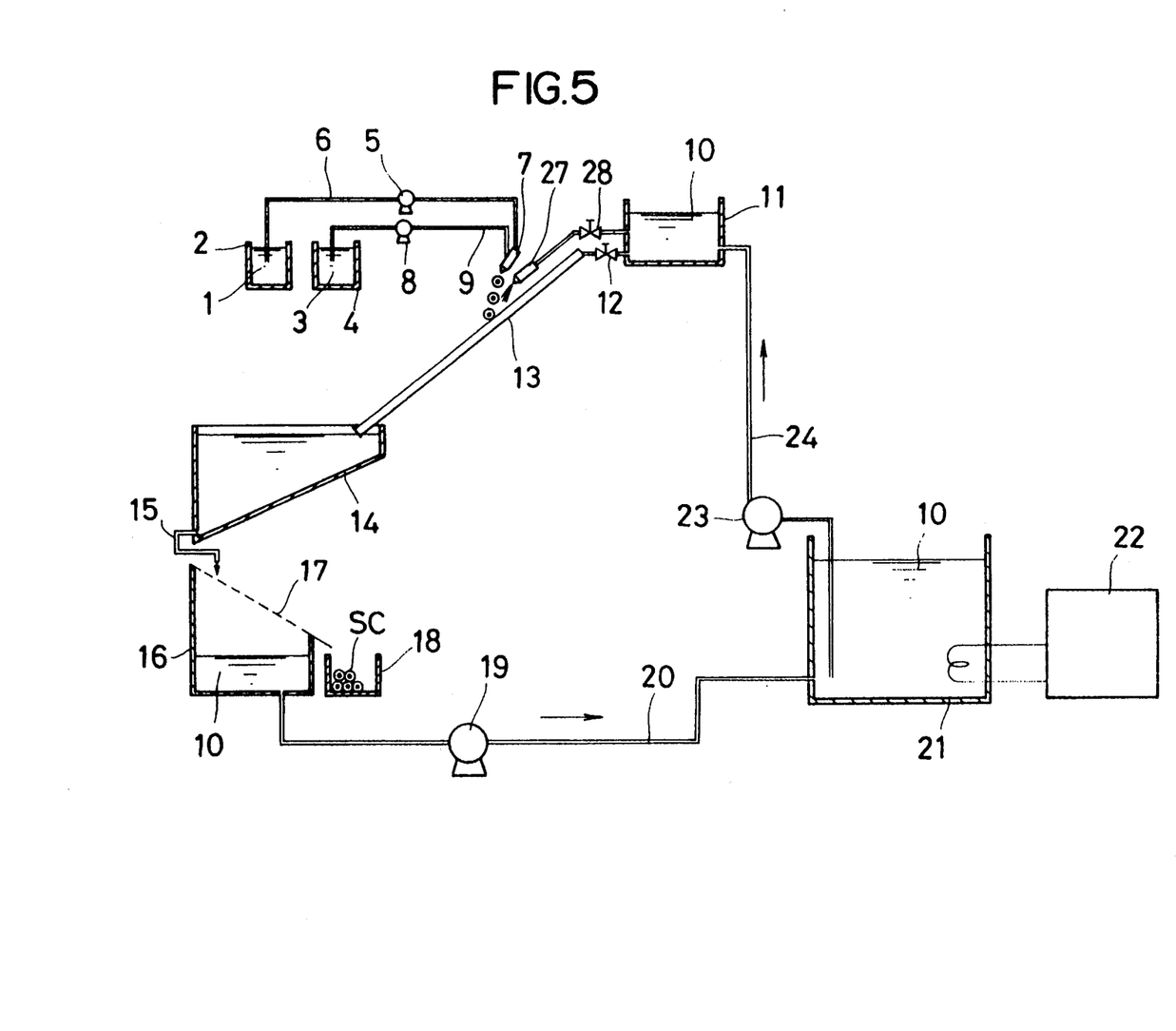
FIG. 5 is an schematic explanatory view showing another embodiment in which the present invention is applied to the in-the-air nozzle type apparatus for manufacturing the seamless capsules.
Figure 6:
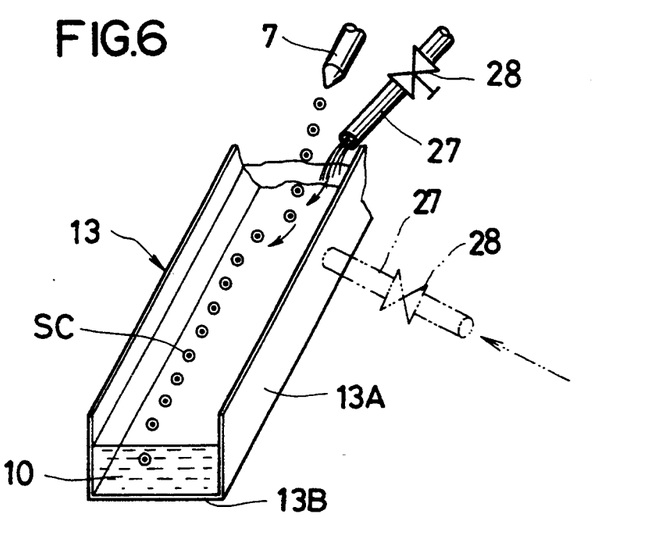
FIG. 6 is an enlarged perspective view showing the essential portion thereof.

FIG. 5 is the schematic explanatory view showing another embodiment in which the present invention is applied to the in-the-air nozzle type apparatus for manufacturing the seamless capsules, and FIG. 6 is the enlarged perspective view thereof.

In this embodiment also, the same reference numerals are used to designate the same or similar parts corresponding to ones in the embodiments shown in FIGS. 1, 2 and FIGS. 3, 4, so that the duplicate description will be avoided.

Particularly, this embodiment has the in-the-air nozzle type construction, so that, in general, this embodiment is relatively analogous to the embodiments shown in FIGS. 1 and 2.

Namely, in the embodiments shown in FIGS. 5 and 6, to adjust the relative speed between the multilayer liquid drops of the seamless capsules SC in the U-shaped groove 13 and the flow of the hardening liquid 10, an auxiliary flow path nozzle 27 for supplying a flow of the hardening liquid as an auxiliary flow is provided in the vicinity of the multiple nozzle 7 in a direction intersecting or preferably perpendicular to the flow of the hardening liquid 10 in the F-shaped groove 13.

This auxiliary flow path nozzle 27 has a valve 28, so that the hardening liquid to the auxiliary flow path nozzle 27 is supplied from the hardening liquid tank 11 through the valve 28.

Accordingly, in this embodiment, as the multilayer liquid drops are blown out of the multiple nozzle 7, the hardening liquid from the auxiliary flow path nozzle 27 is supplied into the flow of the hardening liquid 10 in the U-shaped groove 13, whereby a flow of the hardening liquid is produced in a direction intersecting or preferably perpendicular to the flow of the hardening liquid 10 in the U-shaped groove 13, so that the positions of the multilayer liquid drops in the flow of the hardening liquid 10 are varied in the intersecting direction of the flow of the hardening liquid 10.

With this arrangement, the relative speed between the multilayer liquid drops of the seamless capsules SC and the flow of the hardening liquid 10 is variably adjusted, so that fine adjusting of the relative speed can be made through fine adjustment of the opening degree of the valve 28.

In this embodiment also, a simplified and small-sized construction of merely providing the auxiliary flow path nozzle 27 and the valve 28 makes it possible to optimally adjusting the shapes of the multilayer liquid drops.

Incidentally, as a variant of this embodiment, the auxiliary flow path nozzle 27, which supplies the hardening liquid for an auxiliary flow path, may be constructed to be connected to and through the side wall 13A of the U-shaped groove 13 in a direction intersecting or preferably perpendicular to the side wall 13A, as indicated by two-dot chain lines in FIG. 6, so that the flow of the hardening liquid 10 in the U-shaped groove 13 can be varied.

Embodiment 4

Figure 7:
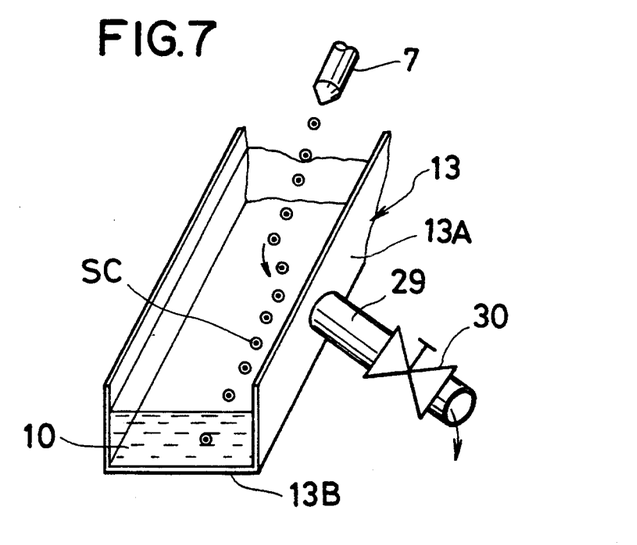
FIG. 7 is an enlarged perspective view of the essential portion showing a modified example of FIGS. 5 and 6.

FIG. 7 is the enlarged perspective view of the essential portions showing a modified example of FIGS. 5 and 6.

In this embodiment, an auxiliary flow path pipe 29 for forming an auxiliary flow path is connected to and through the side wall 13A of the U-shaped groove 13 and a part of the hardening liquid 10 is discharged sidewards through this auxiliary flow path pipe 29, so that the flow of the hardening liquid 10 in the U-shaped groove 13 is changed into a direction intersecting the side wall 13A.

With this arrangement, the positions of the multilayer liquid drops of the seamless capsules SC in the hardening liquid 10 are displaced in the direction intersecting the flow of the hardening liquid 10, and, in the example in FIG. 7, the multilayer liquid drops approach the side wall 13A and the speed becomes low. As the result, the shapes of the multilayer liquid drops can be controlled to the desired ones.

In this case, the provision of a valve 30 in the intermediate portion of a flow course of the auxiliary flow path pipe 29 makes it possible to variably adjust the flow rate of discharge of the hardening liquid.

Embodiment 5

Figure 8A:
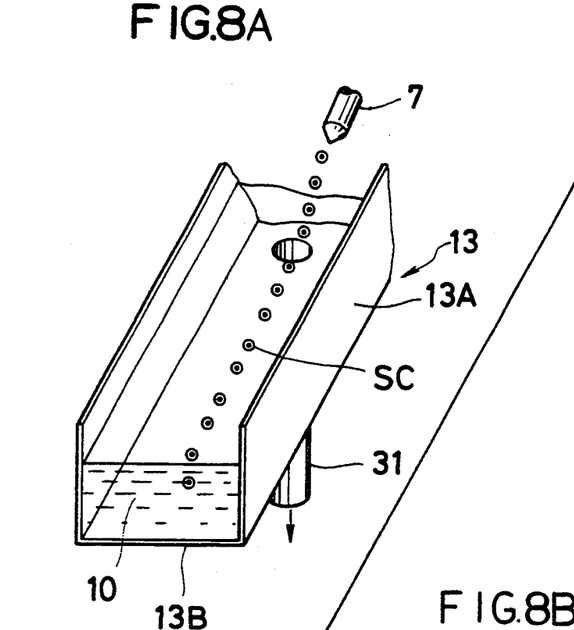
FIGS. 8(A) and 8(B) are an enlarged perspective view and a sectional view of the essential portion showing a further embodiment of the present invention as a modification of the embodiment shown in FIG. 5 and 6.
Figure 8B:
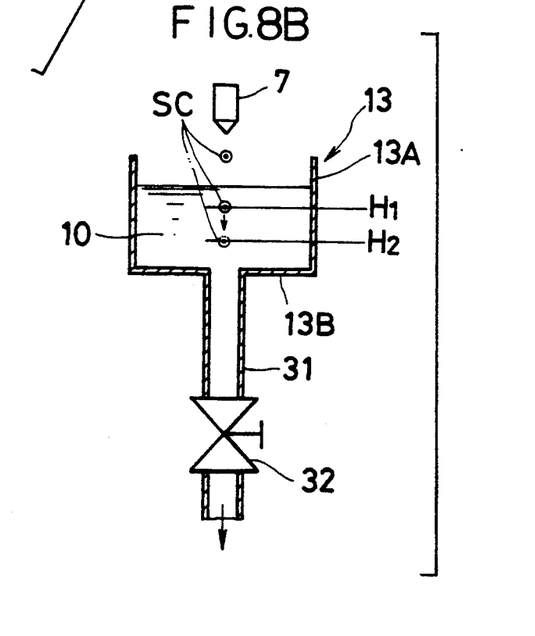

FIGS. 8(A) and 8(B) are respectively the enlarged perspective view and the sectional view of the essential portion showing a further embodiment of the present invention as a modification of the embodiment shown in FIGS. 5 and 6.

In this embodiment, an auxiliary flow path pipe 31 is connected to and through the bottom wall 13B of the U-shaped groove 13, and a part of the hardening liquid 10 in the U-shaped groove 13 is discharged through the auxiliary flow path pipe 31.

Accordingly, in this embodiment, the flow of the hardening liquid 10 is given a downward force through the auxiliary flow path pipe 31, so that the multilayer liquid drops of the seamless capsules SC are lowered from a height $H_1$ to a height $H_2$ in FIG. 8(B) for example.

In other words, the multilayer liquid drops are displaced from the vicinity of the center of the liquid surface where the flowing speed of the hardening liquid 10 is highest to a position close to the bottom wall 13B where the flowing speed is lower.

Consequently, the relative speed between the multilayer liquid drops and the flow of the hardening liquid 10 is varied, so that the shapes of the multilayer liquid drops can be variably adjusted to the optimal ones.

Incidentally, in this embodiment also, a valve 32 is provided in the intermediate portion of the auxiliary flow path pipe 31, so that the flow rate of the hardening liquid 10 discharged from the auxiliary flow path pipe 31 can be adjusted.

Embodiment 6

Figure 9:
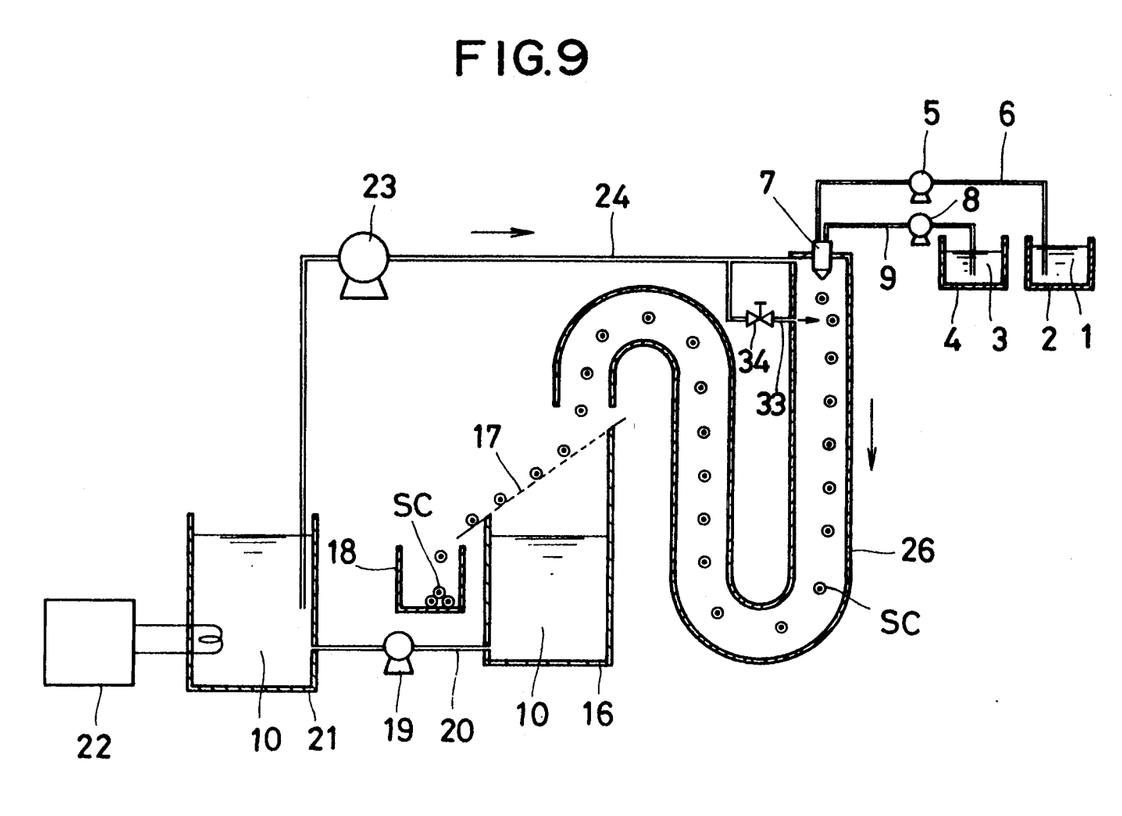
FIG. 9 is a schematic explanatory view showing a still further embodiment in which the present invention is applied to the in-the-liquid nozzle type apparatus for manufacturing the seamless capsules.
Figure 10:
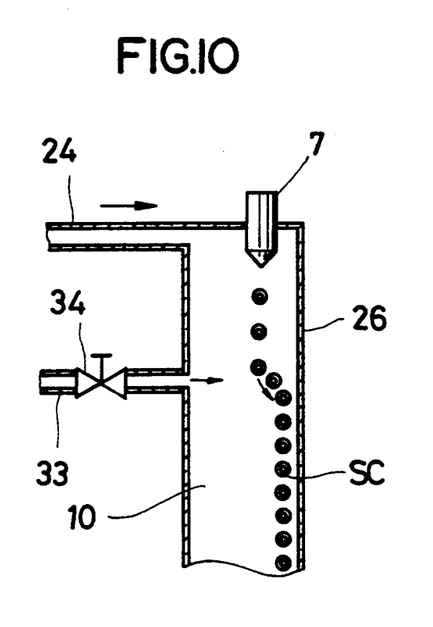
FIG. 10 is an enlarged sectional view of the essential portion of FIG. 9.

FIG. 9 is the schematic explanatory view showing a still further embodiment in which the present invention is applied to the in-the-liquid nozzle type apparatus for manufacturing the seamless capsules, and FIG. 10 is the enlarged sectional view of the essential portion shown in FIG. 9.

In this embodiment, the general construction of the apparatus is substantially identical with the one in the embodiment shown in FIG. 3. However, this embodiment features that, in order to change the positions of the multilayer liquid drops of the seamless capsules SC in the main flow path pipe 26, an auxiliary flow path pipe 33 is connected to and through the main flow path pipe 26 for flowing the hardening liquid in a radial direction, i.e. in a direction intersecting or preferably perpendicular to the flow of the hardening liquid 10.

The hardening liquid is supplied to this auxiliary flow path pipe 33 through a bypass from the intermediate portion of the conduit 24.

Furthermore, a valve 34 for adjusting the flow rate of the hardening liquid 10 flowing in through the auxiliary flow path pipe 33 is provided in the intermediate portion of the course of the auxiliary flow path pipe 33 in this embodiment.

Accordingly, in this embodiment also, the hardening liquid is supplied from the auxiliary flow path pipe 33 into the main flow path pipe 26 in the direction intersecting, or preferably perpendicular to the flow of the hardening liquid 10 in the main flow path pipe 26, so that, as shown in FIG. 10, the flow direction of the hardening liquid 10 in the main flow path pipe 26 is varied and the flow of the multilayer liquid drops of the seamless capsules SC is displaced, in case of FIG. 10, from the vicinity of the central portion where the flowing speed is high to the side wall where the flowing speed is low.

With this arrangement, the relative speed between the multilayer liquid drops and the flow of the hardening liquid can be varied and the flow-in rate of the hardening liquid 10 from the auxiliary flow path pipe 33 through the valve 34 is controlled, so that the optimal shapes of the multilayer liquid drops can be produced at all times.

Embodiment 7

Figure 11:
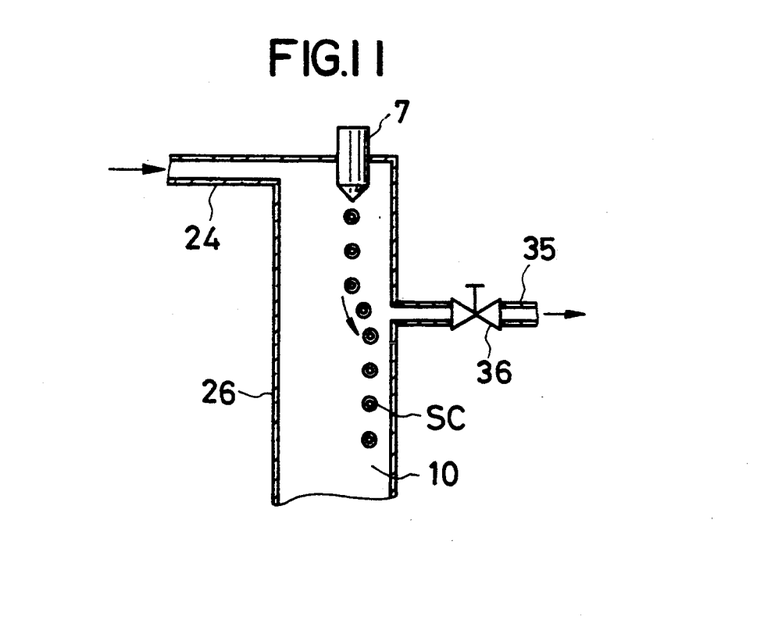
FIG. 11 is an enlarged sectional view of the essential portions of a still more further embodiment of the present invention.

FIG. 11 is the enlarged sectional view of the essential portion of a still more further embodiment of the present invention.

This embodiment corresponds to the modification of the embodiment as shown in FIGS. 9 and 10.

Namely, in this embodiment, in the in-the-liquid nozzle type apparatus for manufacturing the seamless capsules, an auxiliary flow path pipe 35 is connected to and through the main flow path pipe 26 at a position close to the inlet portion, whereby a part of the hardening liquid 10 in the main flow path pipe 26 is discharged through this auxiliary flow path pipe 35, so that the flow direction of the hardening liquid 10 in the main flow path pipe 26 is varied.

Accordingly, in this embodiment also, the part of the hardening liquid 10 in the main flow path pipe 26 is discharged sidewards through the auxiliary flow path pipe 35, whereby the flow of the hardening liquid 10 is changed to the intersecting direction, so that the relative speed between the multilayer liquid drops and the flow of the hardening liquid 10 can be variably adjusted, thereby obtaining the optimal shapes of the multilayer liquid drops at all times.

Incidentally, in this embodiment also, a valve 36 is provided in the intermediate portion of the auxiliary flow path pipe 35, so that, by the control of the opening degree of the valve 36, the discharge flow rate from the auxiliary flow path pipe 35 can be adjusted to a desired value.

Embodiment 8

Figure 12:
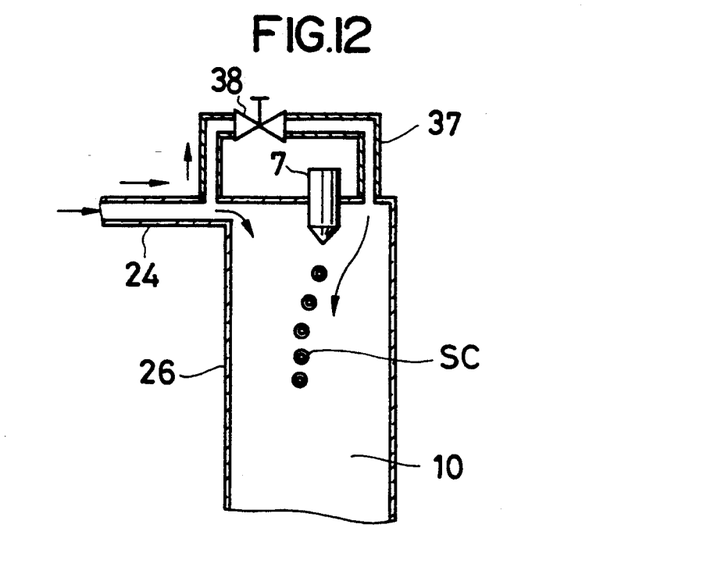
FIG. 12 is an enlarged sectional view of the essential portions of a yet further embodiment of the present invention.

FIG. 12 is the enlarged sectional view of the essential portion of the yet further embodiment of the present invention.

In this embodiment, an auxiliary flow path pipe 37 for changing the direction of the flow of the hardening liquid 10 in the main flow path pipe 26 into an intersecting direction is formed in a bypass shape to be communicated from an outlet end portion of the conduit 24, i.e. a position immediately before the inlet of the main flow path pipe 26 to a position close to the multiple nozzle 7 at the top portion of the main flow path pipe 26. A valve 38 for adjusting flow rate is provided in the intermediate portion of this auxiliary flow path pipe 37.

Accordingly, in this embodiment, a part of the hardening liquid 10 flowing into the main flow path pipe 26 from the conduit 24 is bypassed toward the auxiliary flow path pipe 37 and caused to flow into substantially the axial direction of the main flow path pipe 26 from the top portion thereof, whereby the positions of the multilayer liquid drops of the seamless capsules SC, which are blown out of the multiple nozzle 7, are varied, so that the relative speed between the multilayer liquid drops and the flow of the hardening liquid 10 can be variably adjusted.

As the result, in this embodiment also, the seamless capsules SC with the optimal shape can be manufactured at all times.

The invention by the present inventor has been described in detail above. However, the present invention should not be limited to the above embodiments, and, needless to say, the present invention can be variously modified within a scope of the invention.

For example, as the multiple nozzle, a triple nozzle can be adopted in place of the double nozzle, and various types of vibrating system can be utilized for generating the multilayer liquid drops.

Furthermore, the compositions of the inner layer and the outer layer of the multilayer liquid drop of the seamless capsule may be optionally selected.

Further, the construction of the nozzle moving device, the types of manufacturing and mounting the auxiliary flow path pipes, the types of the valves provided in the courses of the auxiliary flow path pipes, or the like should not be limited to the above embodiments.

Furthermore, in the above embodiments, description has been given of the system for adjusting the flow of the multilayer liquid drops and accordingly the shapes of the multilayer liquid drops, using the nozzle moving device which changes the position of the multiple nozzle (embodiments in FIGS. 1 through 4) or using the auxiliary flow path (embodiments in FIGS. 5 through 12), each of which systems is utilized by itself to attain the desired functional effect. However, the present invention includes the case where the both systems are combinedly used to achieve a desired functional effect.

Out of the inventions disclosed herein, the advantages attained by the typical ones will be briefly described as follows.

(1) The position of the multiple nozzle is movably adjusted in the direction intersecting or preferably perpendicular to the flow of the hardening liquid, whereby the relative speed between the multilayer liquid drops of the seamless capsules and the flow of the hardening liquid can be adjusted, so that the seamless capsules of the satisfactory shapes can be manufactured at all times in accordance with the difference in the types of the seamless capsules and the fluctuations of the various conditions.

(2) In addition to the main flow path of the hardening liquid, the auxiliary flow path of the hardening liquid is provided, and the flow rate of the auxiliary flow path is made to be variably adjustable, whereby the relative speed between the multilayer liquid drops of the seamless capsules and the flow of the hardening liquid can be adjusted, so that the seamless capsules of the satisfactory shapes can be manufactured at all times in accordance with the difference in the types of the seamless capsules and the fluctuations of the various conditions.

What is claimed is:

1. An apparatus for manufacturing seamless capsules comprising:
   a main flow path for a hardening liquid;
   a multiple nozzle through which a multilayer liquid is blown to form multilayer liquid drops which are brought into contact with said hardening liquid flowing through said main flow path, at least a portion of said multiple nozzle being disposed within said main flow path;
   an auxiliary flow path asymmetrical to said main flow path for said hardening liquid extending in a direction intersecting said main flow path and connected to said main flow path;

means for adjusting a flow rate of said hardening liquid in said auxiliary flow path; and means for biasing a flow of said hardening liquid through said main flow path in a direction intersecting the main flow path to adjust the relative speed between said multilayer liquid drops blown out of said multiple nozzle and the flow of said hardening liquid in said main flow path, said biasing means comprising one of a flow of said hardening liquid into said main flow path from said auxiliary flow path and a discharge of said hardening liquid from said main flow path into said auxiliary flow path.

2. The apparatus for manufacturing seamless capsules as set forth in claim 1, wherein:

in a main flow path pipe, which forms the main flow path of said hardening liquid, at least a portion of said multiple nozzle, from which said multilayer liquid is blown out, is positioned within said hardening liquid;

said auxiliary flow path includes an auxiliary flow path pipe connected to a side portion of said main flow path at a position below a blown-out position of the multilayer liquid flow from said multiple nozzle in such a manner that the flow of the hardening liquid of the auxiliary flow path is supplied into the main flow path pipe; and a valve for regulating flow rate is provided in a portion of the auxiliary flow path pipe.

3. The apparatus for manufacturing seamless capsules as set forth in claim 1, wherein:

said multiple nozzle is disposed in a main flow path pipe, which forms a main flow path of said hardening liquid, in such a manner that at least a portion of the multiple nozzle, from which said multilayer liquid flow is blown out, is positioned within said hardening liquid;

said auxiliary flow path comprises a bypass-shaped auxiliary flow path pipe branched from an inlet portion of said main flow path pipe forming the main flow course for supplying the hardening liquid, and connected to the other portion of said main flow path pipe at a position close to a blown-out position of said multilayer liquid flow of said main flow path pipe; and a valve for regulating a flow rate is provided in the intermediate portion of the bypass-shaped auxiliary flow path pipe.

4. The apparatus for manufacturing seamless capsules as set forth in claim 1, wherein:

in a main flow path pipe, which forms the main flow path of said hardening liquid, at least a portion of said multiple nozzle, from which said multilayer liquid is blown out, is positioned within said hardening liquid;

said auxiliary flow path includes an auxiliary flow path pipe connected to a side portion of said main flow path at a position below a blown-out position of the multilayer liquid flow from said multiple nozzle in such a manner that the flow of the hardening liquid of the auxiliary flow path is discharged from the main flow pipe; and a valve for regulating flow rate is provided in a portion of the auxiliary flow path pipe.

* * * * *